United States Patent [19]
Van Grinsven et al.

[11] Patent Number: 5,579,321
[45] Date of Patent: Nov. 26, 1996

[54] TELECOMMUNICATION SYSTEM AND A MAIN STATION AND A SUBSTATION FOR USE IN SUCH A SYSTEM

[75] Inventors: Petrus, A. M. Van Grinsven; Wilfred A. M. Snijders, both of Eindhoven, Netherlands

[73] Assignee: U.S. Philips Corporation, New York, N.Y.

[21] Appl. No.: 213,485

[22] Filed: Mar. 14, 1994

[30] Foreign Application Priority Data

Mar. 15, 1993 [EP] European Pat. Off. .............. 93200742

[51] Int. Cl.$^6$ .................................................. H04J 3/00
[52] U.S. Cl. ..................... 370/95.3; 370/100.1; 370/108; 375/368
[58] Field of Search .................... 370/95.1, 95.6, 370/85.3, 85.1, 105.1, 100.1, 29, 30, 32, 69.1, 77, 91, 82–84, 85.7, 99, 100.1, 105.3, 107, 108; 340/825.5; 455/56.1, 54.1, 38.1, 60, 63, 67.6; 379/63; 375/1, 20, 208, 222, 225, 226, 227, 254, 278, 279, 280, 285, 308, 296, 329, 355, 356, 359, 262, 363, 368, 371, 200, 293; 371/5.1, 5.6, 20.4, 27

[56] References Cited

U.S. PATENT DOCUMENTS

| 5,124,985 | 6/1992 | Hashikawa .............................. 370/95.3 |
| 5,319,634 | 6/1994 | Barholomew et al. ................. 370/95.3 |

FOREIGN PATENT DOCUMENTS

| 0383557 | 8/1990 | European Pat. Off. . |
| 9108623 | 6/1991 | WIPO . |

OTHER PUBLICATIONS

The European Search report, N. V. Philips'Gloeilampen Fabrieken, Sep. 1994, pp. 1–2.

*Primary Examiner*—Douglas W. Olms
*Assistant Examiner*—Dang Ton
*Attorney, Agent, or Firm*—Leroy Eason

[57] ABSTRACT

Telecommunication systems such as PON-FITL-Systems have a TDMA frame structure comprising a main station and a number of substations. In order to achieve accurate fine ranging, an A/D-converter for acquiring samples from a ranging pulse transmitted from the substation is operated at a frequency which is high with respect to the master or bit clock, i.e. real time oversampling occurs. Such high speed A/D-converters are expensive, consume much power and have limited resolution. Furthermore, for systems with even higher bit rates the known oversampling becomes cumbersome. A quasi-oversampled coarse and/or fine ranging is proposed operating at relatively low sampling rates. Thus the substations send a repetitive ranging-bit-pattern which is sampled in the main station and thereafter reconstructed in a processing apparatus to a quasi-oversampled ranging-bit-pattern. In order to find the ranging error to be sent to the relevant substation, the quasi-oversampled ranging-bit-pattern is matched against a reference pattern, and the ranging error is found from the best match.

21 Claims, 4 Drawing Sheets

5,579,321

TELECOMMUNICATION SYSTEM AND A MAIN STATION AND A SUBSTATION FOR USE IN SUCH A SYSTEM

BACKGROUND OF THE INVENTION

The present invention relates to a telecommunication system comprising a main station and a plurality of substations, in which system communication between the main station and the substations occurs at a predetermined bit rate via a transmission channel on the basis of a multiple access protocol. The channel is at least partially common to the substations. For ranging the substations, the system comprises transmission means for transmitting ranging information to the main station and adjustment means for at least adjusting the timing for transmitting information to the main station on the basis of ranging control information received from the main station. The main station comprises receiving means for receiving the ranging information, sampling means for taking samples from the ranging information, and processing means for determining the ranging control information from the samples. Depending on the transmission channel used, i.e. a glass fibre, a coaxial cable or a radio link, the telecommunication system can be a passive optical network (PON), a local area network, a satellite system or a cellular mobile radio system or the like.

The present invention further relates to a main station for use in such a system.

The present invention further relates to a substation for use in such a system.

A telecommunication system of this kind is known from the International Application No. WO 91/08623, in which a TPON (Telephony on a Passive Optical Network) is disclosed comprising a head-end station broadcasting TDMA (Time Division Multiple Access) frames to a number of termination units on an optical network in a downstream direction. In an upstream direction, each termination unit transmits data in a predetermined time slot and the data from the different terminations are assembled at the head-end into a TDMA frame of a predetermined format. For compensation at start-up or in operation of the TPON of differing delays and attenuation associated with the different distances of the various terminations from the head-end station, in the TPON each termination is arranged to transmit coarse and fine ranging pulses timed to arrive in a respective predetermined portion of the upstream TDMA frame. In FIG. 2 of WO 91/08623 a so-called phase 1 ranging window for coarse ranging and a so-called phase.2 window for fine ranging within the upstream TDMA frame is shown. The head-end station is arranged to monitor the timing, i.e. phase and amplitude of the arrival of ranging pulses from each of the terminations and to return a servo-control signal to the termination to retard or advance its transmissions as appropriate and to adjust the transmission power. The frames in this TPON have a predetermined bit rate. For achieving active fine ranging in the known TPON respective received ranging pulses from the terminations are sampled in the head-end station at a high sampling rate greater than the said predetermined bit rate, and the samples are processed to determine the respective phases of the ranging pulses relative to respective expected values. The head-end generates the ranging control signals from the determined phase differences between the received and expected phases and transmits the respective control signal to the terminations, which modify the phase of transmissions from the terminations accordingly so as to avoid overlapping of data within a frame in the upstream direction. The TPON operates at 20 Mbit/s. To achieve a required fine ranging accuracy of about 0.1 bit period of a predetermined bit rate in the TPON, at least four times oversampling is required, the necessary extra accuracy being achieved by means of "dithering", i.e. averaging phase inaccuracies in the sampling and clock moments. Due to the applied oversampling Analog-to-Digital Converters, A/D-converters have to be used suitable for such high sampling rates, such A/D-converters being expensive, consuming much power and having limited resolution. For systems with even higher bit-rates, e.g. 40 Mbit/s or over, the disclosed oversampling technique for the purpose of fine ranging becomes cumbersome in achieving the required accuracies.

In the European patent application No. 0 383 557 a TPON is disclosed in which data is communicated between a central exchange and a number of remote subscriber stations in which system, typically operating at 20 Mbit/s, a single clock is used throughout the system. To achieve a 0.1 bit system accuracy the central exchange includes, on its receive side, a phase alignment system which enables the exchange to handle received data using only its local master clock despite arbitrary variations in phase. The phase alignment system comprises a lumped constant delay line formed from discrete reactive components, the delay line having taps at 0.1 bit of the system bit rate. For phase alignment purposes each tap is monitored by an eye position detection circuit. In this system data are transmitted using an extended version of the standard ATM (Asynchronous Transfer Mode), data cells in the upstream direction comprising a three bit lead-in header providing the "eye", the position of which is determined by the eye position detection circuit in order to identify the appropriate tap. Although accurate, this system, which effectively implies real time oversampling at ten times the master clock, is complicated, has similar disadvantages as to power consumption as the said WO 91/08623, and becomes cumbersome at still higher frequencies.

It is an object of the present invention to provide simple and inexpensive fine and/or coarse ranging in a telecommunication system of the above kind having the required accuracy while at the same time being suitable for future higher system master clock frequencies.

SUMMARY OF THE INVENTION

To this end a telecommunication system according to the present invention is characterized in that the substation is arranged to transmit a repetitive ranging-bit-pattern as ranging information to the main station, and in that the processing means in the main station are arranged to process samples of the repetitive ranging-bit-pattern such that a quasi-oversampled ranging-bit-pattern is obtained, the processing means being arranged to derive fine and/or coarse ranging control information from the quasi-oversampled ranging-bit-pattern. The present invention, by sampling the repetitive ranging-bit-pattern at a relatively low sampling rate in the main station and by shuffling or regrouping the acquired samples after acquisition has taken place, makes it possible to obtain accurate fine ranging which may at the same time even be combined with a certain extent of coarse ranging, depending on the ranging-bit-pattern chosen and the ranging-bit-pattern repetition rate. The ranging according to the present invention may be combined with the coarse ranging as disclosed in the simultaneously filed U.S. patent application No. 08/213,483, based upon a Pseudo Noise Ranging Sequence and allowing coarse ranging for a substation to be added in a system in operation, such a coarse ranging system typically achieving a ranging accuracy within a few bits.

In an embodiment of the system according to the present invention, the substation is further arranged to transmit a preamble-bit-pattern preceding the repetitive ranging-bit-pattern, the processing means in the main station being arranged to derive coarse ranging control information from samples of the preamble-bit-pattern by evaluating logic transitions therein. Although the present invention to a certain extent allows for coarse ranging, as well as for free ranging, on the basis of the repetitive ranging-bit-pattern by the choice of a suitable bit-pattern, it is advantageous to add the preceding preamble-bit-pattern to the repetitive ranging-bit-pattern. By adding the preamble-bit-pattern the inaccuracy of coarse ranging methods, to be combined with the present invention, can be reduced so that a shorter elementary bit pattern can be chosen in the repetitive ranging-bit-pattern. In fact, it is possible to dispense with other coarse ranging methods which otherwise could be combined with the present invention, the coarse ranging at system start-up being done on the basis of the preamble-bit-pattern. With a suitably chosen preamble-bit-pattern, e.g. a number of consecutive ones followed by a few zeroes, the amplitude of the received ones can be used for scaling a reference-bit-pattern in accordance with the received power or vice versa, in the case of a PON of the optical power, the reference-bit-pattern being used by the processing means for matching with the reconstructed ranging-bit-pattern.

In an embodiment of the system according to the present invention, the ranging bit-pattern comprises M bits having a bit period reciprocal to the predetermined bit rate, the ranging-bit-pattern being such that all M−1 cyclic shifts thereof are different, M being an integer. Due to the cyclic shift property the ranging-bit-pattern can be as short as possible while at the same time allowing for maximum coarse ranging error correction. With such an M-bit pattern, a coarse ranging error of (M−1)/2 data bits can be corrected.

In a preferred first embodiment of the system according to the present invention, for the sake of fine ranging with an accuracy of 1/Nth of the bit period and with a sampling rate of 1/K times the predetermined bit rate, the ranging-bit-pattern is repeated K.N times, K and N being integers and the greatest common divisor of K and M being one, K<M, and wherein a phase of a sampling clock for clocking the sampling means is shifted incrementally or decrementally during sampling, the processing means obtaining the quasi-oversampled ranging-bit-pattern by regrouping the samples. This embodiment is based upon the insight that quasi-oversampling can be achieved by phase shifting the sampling clock over a small distance with a ranging-bit-pattern each time, with a total shift smeared out over the complete repetitive ranging-bit-pattern or a multiple thereof, depending on the frequency of the sampling clock with respect to the predetermined bit rate or bit clock, and by regrouping the acquired samples later on. In a simple embodiment, in the case where the sampling clock is equal to the bit rate, all first samples of each sampled repetitive ranging-bit-pattern are grouped together in the sampled order, thereafter all second samples, and so on, the processing means deriving the ranging control information from the regrouped samples. The processing means can be a standard microcontroller comprising a microprocessor, RAM and ROM or EPROM memory and I/O-interfaces, so that the acquired samples can first be stored in the RAM and later be processed to get a quasi-oversampled ranging-bit-pattern, under programmed control the a program being stored in the EPROM. According to the present invention from a logical point of view shuffling of samples is required, although, depending on the implementation means, shuffling from a physical point of view could be dispensed with at least to a certain extent. In the example given, by first shuffling the samples physically, the software necessary for further processing can be simpler. The sampling clock phase increments can easily be implemented by using a digital or lumped element delay line.

In a modified first embodiment of the system according to the present invention, the system is modified in that the phase of the sampling clock is fixed during sampling, and in that the substations transmit the ranging-bit-pattern with successive phase increments or decrements. In this embodiment, which is functionally the same, on the one hand the main station is simpler, no sampling clock shifting being necessary, but on the other hand all substations have to take care of the required shifting.

In a second embodiment of the system according to the present invention, for the sake of fine ranging with an accuracy of 1/Nth of the bit period, the ranging-bit-pattern is repeated K times, the frequency of the sampling clock is N/K times the bit rate, K being chosen such that both the greatest common divisor of K and N, and of K and M, being one, the processing means obtaining the quasi-oversampled ranging-bit-pattern by regrouping the samples. Instead of making small phase shifts to the samples over the repetitive ranging-bit-pattern, the sampling clock frequency is chosen such that effectively the same result is achieved, i.e. the sampling clock is given a small deviation with respect to the bit clock. By a suitable shuffling or regrouping the quasi-oversampled ranging-bit-pattern is achieved as before.

In a further embodiment of the system according to the present invention, for obtaining a fine ranging error the quasi-oversampled ranging-bit-pattern is correlated with a reference-bit-pattern which is identical to the transmitted ranging-bit-pattern, the fine ranging error being obtained at maximum correlation of the received ranging-bit-pattern and the reference-bit-pattern. The matching process can be a well known correlation method using a vector dot product, although also a well known Least Square Error method can be used.

In a still further embodiment of the system according to the present invention the reference-bit-pattern is amplitude scaled in accordance with an expected ranging-bit-pattern to be received. In this embodiment distortion effects of the channel on the ranging information transmitted by the substations to the main station has been taken into account, thus giving rise to better matching properties at the side of the main station.

BRIEF DESCRIPTION OF THE DRAWINGS

The present invention will now be described, by way of example, with reference to the accompanying drawings, wherein.

Throughout the figures the same reference numerals are used for the same features.

DETAILED DESCRIPTION OF THE PREFERRED EMBODIMENTS

Figure 1:
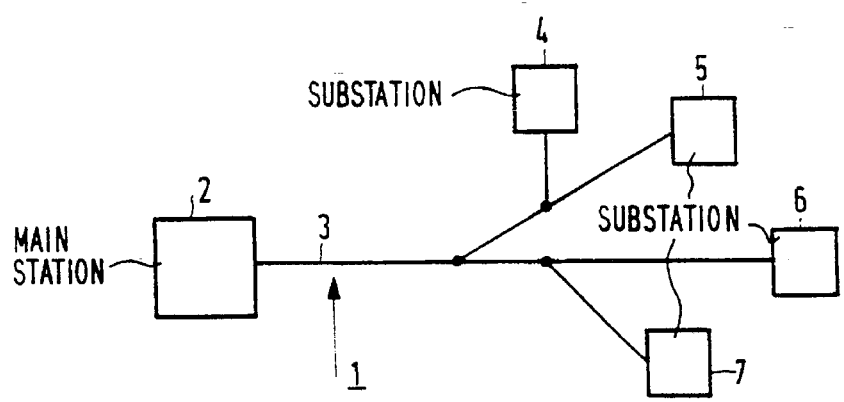
FIG. 1 schematically shows a telecommunication system according to the present invention.

FIG. 1 schematically shows a telecommunication system 1 according to the present invention comprising a main station 2 communicating via a transmission channel 3 with a plurality of substations 4, 5, 6 and 7. In practice there can be numerous substations. The channel 3, which is at least partially common to the substations 4 to 7, is a glass fibre cable in the case where the transmission system 1 is a Passive Optical Network (PON), also called a PON-FITL-System (Fibre in the Loop). The main station 2 can be a local telephone exchange and via the substations 4 to 7 a subscriber or a group of subscribers have access to various services such as telephone, facsimile and telex. In the latter case the system is a so-called TPON (Telephone Passive Optical Network). In a PON splitting and combining of optical signals on the channel for transport of information to and from the main station 2 is well known. For details refer is to general art in this field. The telecommunication system 1 can also be a mobile radio telephony system, in which the main station or stations 2 are fixed stations and the substations 4 to 7 are mobile stations such as portable telephones, mobile telephones etc., the transmission channel 3 then being a radio link. In the telecommunication system 1 multiple access protocol based communication between the main station 2 and sub stations 4 to 7 occurs, such as TDMA (Time Division Multiple Access), as is well known in the art. In such a system 1 the main station, being a master controlling the system 1, transmits TDMA-frames, to be described below in the sequel, to the substations 4 to 7, in a so-called downstream direction, whereas the substations 4 to 7 transmit information in an upstream direction to the main station 2. In such a system 1 access conflicts may arise if special measures are not taken with respect to the timing of the upstream communication, varying and different transmission delays and frame positions have to be adjusted in the substations before transmission. In the cited WO 91/08623, for resolving these access conflicts and for achieving an accurate bit timing, both coarse ranging and fine ranging are described.

Figure 2:
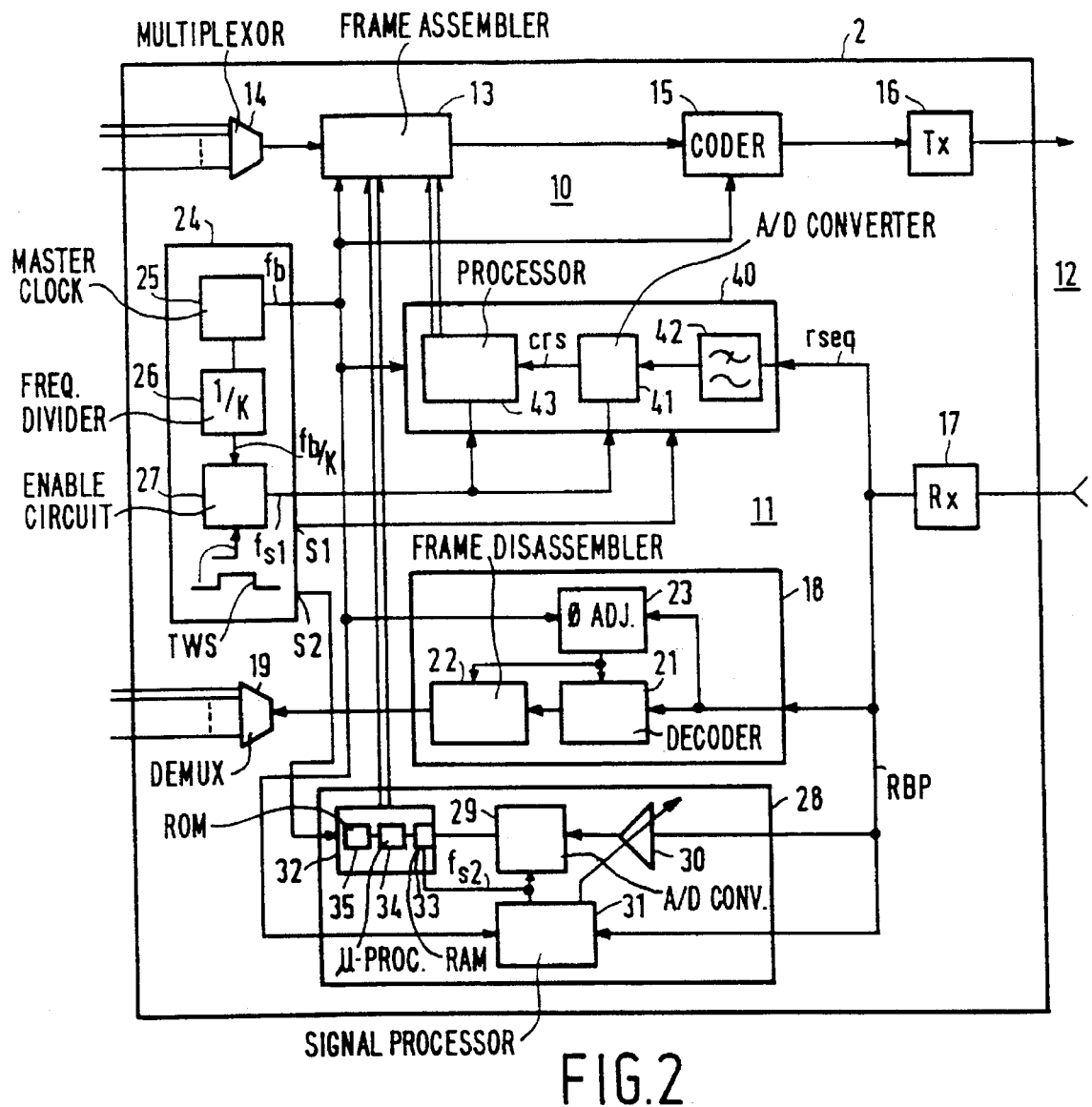
FIG. 2 shows a main station for use in the telecommunication system according to the present invention.

FIG. 2 shows a main station 2 for use in the telecommunication system 1 according to the present invention and suitable for transmission and reception of TDMA signals. The main station 2 comprises a transmitter branch 10 and a receiver branch 11 coupled to a transmission channel 12. In the transmitter branch 10 subscriber signals for various substations are fed to a frame assembler 13 via a multiplexer 14. The multiplexed signal, also comprising synchronising and as the case may be coarse and fine ranging control information, is fed to the channel 12, after being coded in a coder 15, via transmitter 16. Channel coding is done for achieving a suitable frequency spectrum on the channel. Signals from the substations 4 to 7 are received by a receiver 17, an output of which is coupled to frame disassembling means 18 for providing information to various subscribers via a demultiplexer 19. The disassembling means 18 comprise a decoder 21 which is coupled to a frame disassembler 22. The decoder 21 and the disassembler 22 are provided with a clock signal by a Phase Adjustment circuit 23. The main station 2 further comprises timing and control means 24 comprising a system or master clock circuit 25 for providing a master clock $f_b$, which is fed to the Phase Adjustment circuit 23 and to the frame assembler 13, inter alia. The timing and control means 24 further provide a start signal S1 to be used to start a Pseudo Noise Sequence based correlative coarse ranging as described in the simultaneously filed U.S. patent application No. 08/213,483, the contents of which is incorporated herein by reference thereto, and a start signal S2 to be used in fine and/or coarse ranging according to the present invention. The start signals S1 and S2 are a fixed reference for the main station 2 with respect to the beginning of the downstream frames for determining transmission delays or round-trip delay of the substations 4 to 7. The main station 2 is further coupled to fine and/or coarse ranging means 28 according to the present invention for determining free delay and/or coarse delay information from ranging pulses transmitted by the substations 4 to 7 at the request of the main station 2. The ranging means 28 comprise an analog-to-digital converter 29 which is coupled to the receiver 17 via a variable gain amplifier 30. The ranging means 28 further comprise a signal processing unit 31 which is arranged to detect a trailing edge of a preamble-bit-pattern, and to estimate the signal amplitude of the preamble-bit-pattern in order to adjust the gain of the variable gain amplifier 30. Furthermore, the signal processing unit derives a sample clock $f_{s2}$ from the bit clock $f_b$. For processing samples according to the present invention the ranging means 28 comprise processing means 32, e.g. a microcontroller with a RAM memory 33, a microprocessor 34 and a ROM or EPROM memory 35 comprising a stored program for deriving ranging control information from the samples in the RAM memory 33. The free and/or coarse ranging control information is assembled in the frames to be transmitted to the substations 4 to 7 by the frame assembler 13. The receiver 17 is coupled to further coarse ranging means 40 comprising an analog-to-digital converter 41 for sampling coarse ranging information transmitted to the main station 2 by any substation 4 to 7 at the request of the main station 2. The coarse ranging means 40 can be a Pseudo Noise Sequence based means as described in said simultaneously filed U.S. patent application No. 08/213,483. For this coarse ranging the timing and control means 24 comprise a divider 26, and an enable circuit 27 controlled by a window pulse TWS for providing an enabled clock $f_{s1}$, which is a divided master clock $f_b/K$ gated by the enable circuit 27, to the further coarse ranging means 40. Coarse ranging samples crs at an output of the analog-to-digital converter 41 are fed to processing means 43 for processing the coarse ranging samples. The processing means 43 provide coarse ranging information to the frame assembler 13 so that coarse ranging control information is transmitted to the substation to be coarseranged.

Figure 3:
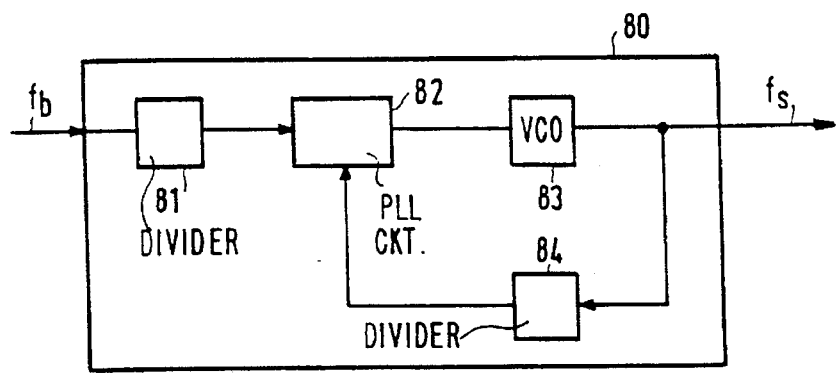
FIG. 3 shows a clock frequency converter for use in an embodiment of the present invention.

FIG. 3 shows a clock frequency converter 80 for use in an embodiment of the present invention, comprising a divider circuit 81 for dividing the master or bit clock $f_b$, to be fed to the clock frequency converter 80, and a PLL loop comprising a PLL circuit 82, a voltage controlled oscillator 83 and a divider circuit 84. By a suitable choice of the division factors of the respective dividers 81 and 84, a sample clock $f_s$ at an output of the clock frequency converter 80 can be obtained having a frequency which is a rational factor of the bit clock frequency $f_b$.

Figure 4:
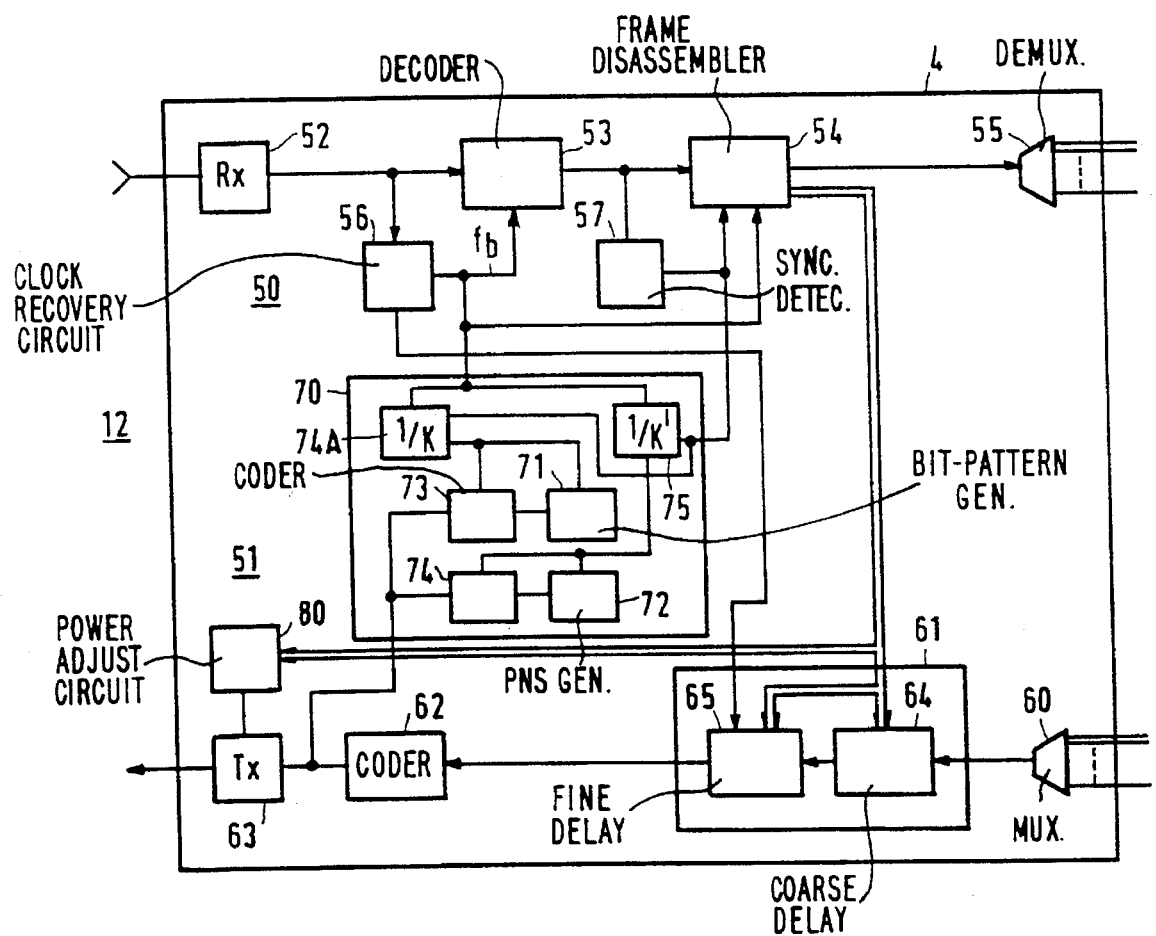
FIG. 4 shows a substation for use in the telecommunication system.

FIG. 4 shows a substation 4 for use in the telecommunication system 1 according to the present invention. The substation 4 comprises a receiver branch 50 and a transmitter branch 51 coupled to the transmission channel 12. The receiver branch 50 comprises a series arrangement of a receiver 52, a decoder 53, a frame disassembler 54 and a demultiplexer 55. At a receiver output the clock is recovered by means of a clock recovery circuit 56, whereas a sync detector 57 is coupled to an output of the decoder 53. The transmitter branch 51 comprises a series arrangement of a multiplexer 60, coarse and fine adjustment means 61, a coder 62, and a transmitter 63. Functionally, the substations 4 to 7 operate similar to the main station 2, as far as transmission and reception is concerned. The coarse and fine adjustment means 61 comprise a coarse delay adjustment section 64 and a fine delay adjustment section 65, both coupled to the frame disassembler 54, which provides coarse and free adjustment control information from the main station 2 via housekeeping time slots in the downstream multiframe. In order to obtain fine adjustments smaller than a symbol period, the fine delay adjustment section 65 has to be clocked at a higher frequency than the symbol frequency $f_b$. To this end, the clock recovery circuit 56 comprises a separate clock output with a higher clock. For generating ranging information to be transmitted to the main station 2, the substation 4 comprises ranging information generating means 70 comprising a bit-pattern generator 71 for generating a preamble-pattern and a repetitive ranging-bit-pattern pattern for coarse and/or fine ranging according to the present invention, a Pseudo Noise Sequence generator 72 for generating ranging information as described in said simultaneously filed U.S. patent application No. 08/213,483, and respective coders 73 and 74 which are coupled to the transmitter 63. The ranging information generating means 70 are initiated at a request for ranging originating from the main station 2 and which is sent via a housekeeping time slot. Enabling signals for enabling the bit-pattern generator 71 or the Pseudo Noise Sequence generator 72, depending on the particular request from the main station 2, are not further shown in detail. The generator 71 and the coder 73 are clocked by a clock $f_b/K$, K being a positive integer. The clock $f_b/K$ is derived from an output of the clock recovery circuit 56, an output of which is fed to a divider circuit 74A. Similarly, the generator 72 and the decoder 74 are clocked by a clock $f_b/K'$, K' being a positive integer, clock $f_b/K'$ is derived by dividing the clock $f_b$ in the divider circuit 75. The substation 4 also comprises power adjustment means 80 which are coupled to the transmitter 63 and to the frame disassembler 54, the power adjustment means 80 adjusting the power to be transmitted by the substation 4 in accordance with the received power control information transmitted by the main station 2.

Figure 5:
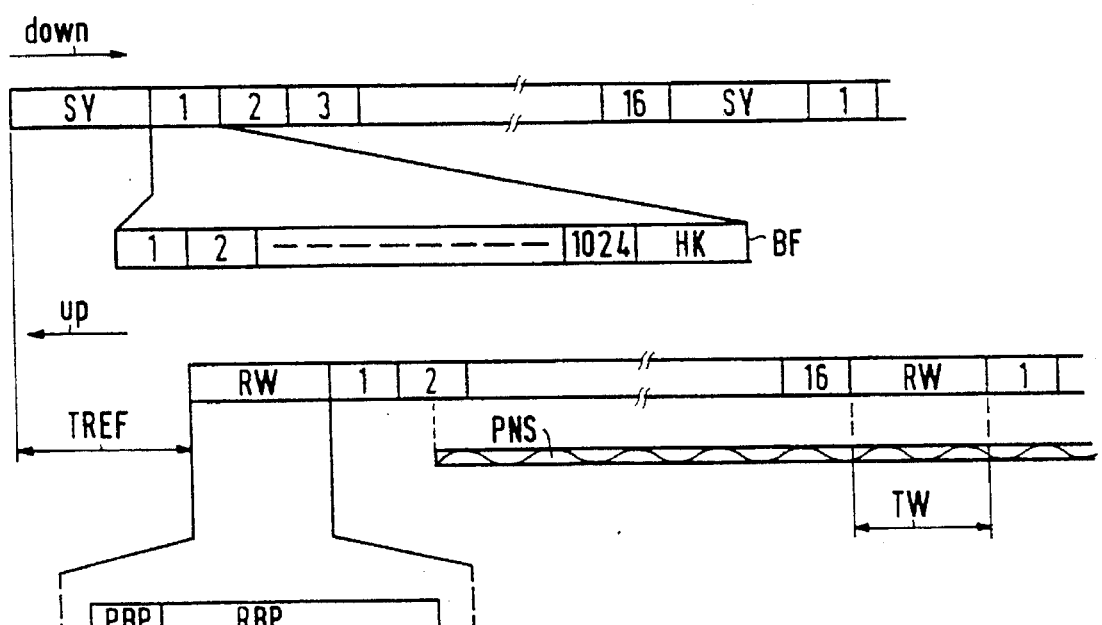
FIG. 5 shows downstream and upstream frames in the telecommunication system, FIGS. 6(A–B) show sampling of a repetitive ranging-bit-pattern in a first and a second embodiment of the present invention.

FIG. 5 shows downstream and upstream TDMA (Time Division Multiple Access) frames down and up in the telecommunication system 1. In the downstream direction down, the main station 2 transmits a multiframe down assembled with the assembler 13 to the substations 4 to 7. In the given example the multiframe down comprises a sync time slot SY allowing the substations to synchronize to the main station and to extract the time slot allocated to them. In the given example, the multiframe down comprises 16 basic flames BF, each having 1024 time slots available for data transport and each having housekeeping time slots HK. The time slots can be allocated at subscribers or groups of subscribers dynamically. Preferably, the upstream multiframe up has a similar structure as to data and housekeeping time slots, but instead of a sync time slot, a ranging window is reserved in the frame for ranging purposes. The main station 2 sets a fixed delay TREF for the multiframe up in the upstream direction with respect to the multiframe down. For coarse ranging within certain limits, e.g. 4 data bit, and fine ranging according to the present invention, it can be arranged that ranging information transmitted by the substations 4 to 7 to the main station 2 falls within a ranging window RW, the ranging information comprising a repetitive ranging-bit-pattern RBP and optionally, a preamble-bit-pattern PBP. By using ranging information with a sequence length which is eight bits less than the width of the ranging window RW, the received ranging information fails within the ranging window if it has a coarse ranging accuracy of ±4 bits. Assuming coarse ranging at system start-up with an accuracy of ±4 bits, the ranging according the present invention can also correct coarse ranging errors when the system is in operation, provided these errors do not exceed 4 bits, errors exceeding 4 bits giving rise to interference with data transmitting substations as the case may be. The coarse ranging according to the present invention can also be applied at system start-up when no subscriber data are transmitted yet in the system. In the latter situation the main station 2 is looking for the preamble PBP transmitted at its request by the relevant substation, the main station 2 continuously sampling the received information and at the same time incrementing a software counter with the bit clock. On finding the preamble, the counter value is a measure of the coarse delay. It is to be realized that at system start-up the substations are not aware of any time reference of the main station, i.e. the substations live on their own time axis, not being aware of the main station's time axis. Accordingly, pulse based coarse ranging is not an option for initial ranging of substations in a system in operation. For arbitrary coarse ranging in a system in operation the coarse ranging as described in the said simultaneously filed European patent application can be applied. Therein, for the sake of coarse ranging a low amplitude Pseudo Noise Sequence PNS is transmitted by the substation to be coarse-ranged initially, the main station 2 sampling the PNS within a time window TW at the beginning of the upstream frame up, of which the position is exactly known to the main station 2 with respect to its own timing axis. The samples acquired inside the time window TW are correlated which a reference sequence with is identical to the transmitted PNS. The delay is determined from the position of the sampled sub-sequence within the reference PNS giving maximum correlation.

Figure 6A:
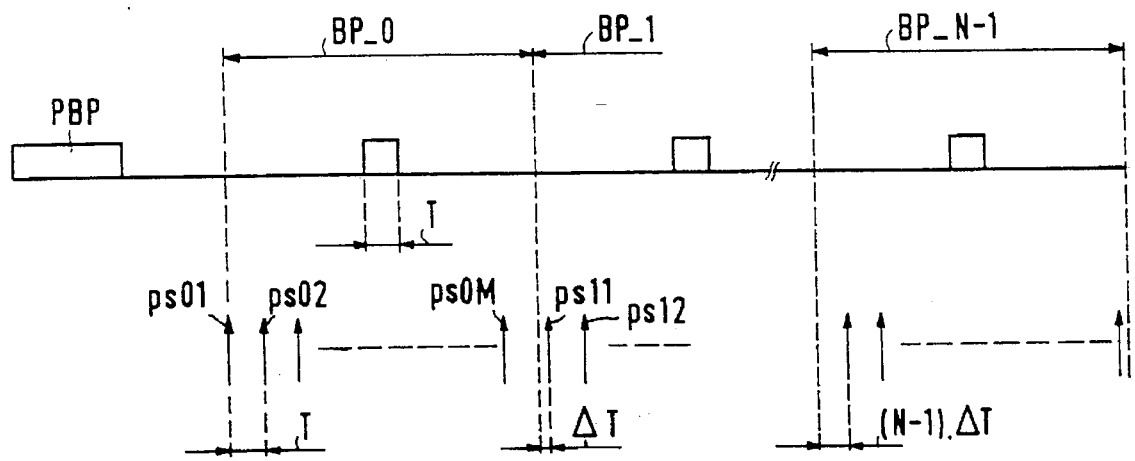
Figure 6B:
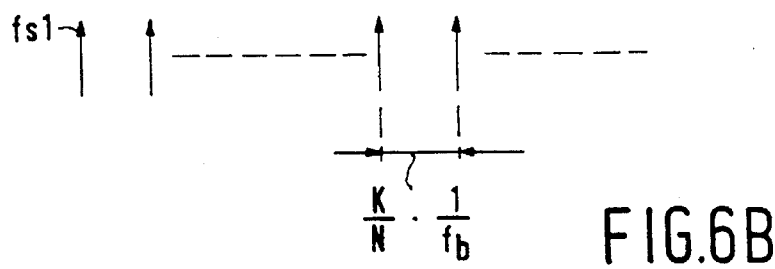

FIGS. 6(A–B) show the sampling of a repetitive ranging-bit-pattern RBP in a first and a second embodiment of the present invention, indicated with A and B in FIG. 6. In the example given the repetitive ranging-bit-pattern RBP consists of N elementary bit patterns BP_0 to BP_N–1, N being an integer, of bits having a bit period T which is the reciprocal of the bit clock $f_b$. The elementary bit-pattern shown is an M-bit pattern, M being an integer, in the example given M=9 and the bit-pattern is "000010000". The parameter M depends on the coarse ranging accuracy. With an M-bit bit-pattern a coarse ranging error of (M–1)/2 bits can be corrected, so in the given example 4 bits coarse ranging correction can be achieved. The M-bit pattern has to be chosen such that all M–1 cyclic shifts of the pattern are different, an M-bit pattern having multiplicity when shifted cyclically giving rise to unnecessary long patterns. In practice the repetitive ranging-bit-pattern can be a few hundreds of bits, thus not effecting the frame efficiency very much. In the first embodiment of which sampling is shown on line A, in the example given it being assumed that the frequency of the sample clock $f_2$ is equal to the frequency of the bit clock $f_b$, multi-phase sampling is applied, i.e. each time before a next ranging-bit-pattern is sampled, the phase of the sampling clock $f_2$ is incremented by an amount $\Delta T$. Thus the ranging-bit-pattern BP_0 is sampled with a non-shifted sampling clock $f_2$, the ranging-bit-pattern BP_1 with a sampling clock $f_2$ shifted over $\Delta T$, and so on, the ranging-bit-pattern BP_N−1 being sampled with a sampling clock $f_2$ shifted over $(N-1).\Delta T$. The respective samples are indicated with ps01, ps02, ..., ps0M for the bit-pattern BP_0, ps11, ps12, ... for the bit-pattern BP_1, ..., and so on. After regrouping an elementary quasi-oversampled ranging-bit-pattern is achieved, a first bit in the bit-pattern being oversampled with the samples ps01, ps11, ps21, ..., a second bit being oversampled with the samples ps02, ps12, ..., and so on. Instead of sampling with a shifted sampling clock, the sampling clock may remain fixed, in this case the substations taking care of the necessary phase shifts each time when transmitting a next ranging-bit-pattern. Functionally, this modified embodiment achieves the same result. The processing means 32 regroup or shuffle the acquired samples such that a quasi-oversampled ranging-bit pattern is obtained from which ranging control information for the substations is derived. More generally, the number of repetitions x of the M-bit pattern is determined by the required fine ranging accuracy and the sampling rate at the main station 2. For achieving a fine ranging accuracy of 1/Nth of the bit period, with a sampling rate of 1/K times the bit rate, it holds that x=K.N. It should further hold that the greatest common divisor of K and M equals one, and that K<M. Let $x_l$, l=0, 1, ..., NM−1 denote the received samples, then the index l can uniquely be written as $$l = iM + j, \quad 0 \leq i \leq N, \quad 0 \leq j \leq M$$

The samples $x_l$ are regrouped or shuffled to represent a reconstruction $s_k$, k=0, 1, ..., NM−1 of the M-bit pattern according to the following relation:

$$s_{i+((jK) \bmod M)N} = x_{iM+j}, \quad 0 \leq i < N, \quad 0 \leq j \leq M$$

In the above formula mod is a modulo-operator, i.e. an operation achieving the remainder after division of a first operand by a second operand. The ranging error is calculated by means of correlation of the reconstructed M-bit pattern with a reference pattern $r_i$ being identical to the transmitted pattern. NM correlation values $c_j$ are calculated, j=0, 1, ..., NM−1:

$$c_j = \sum_{i=1}^{NM-1} s_i\, r_{(i+j) \bmod NM}, \quad j = 0, 1, \ldots, NM-1$$

The fine ranging error $E_f$ is calculated from the index $j_0$ of the maximum correlation value according to the following formula:

$$E_f = -j_0 T/N, \quad 0 \leq j_0 < (NM-1)/2$$

$$E_f = (NM - j_0)T/N, \quad j_0 > (NM-1)/2$$

Scaling of the reference pattern and the received pattern does not influence the location of the correlation peak. However, the value of the correlation peak is a measure of the received power. In the second embodiment of which sampling is shown on line B, the phase of the sampling clock $f_{s2}$ is fixed, whereas the frequency of the sampling clock $f_{s2}$ is chosen such that after shuffling of received samples a quasi-oversampled ranging-bit-pattern is achieved. The clock frequency converter 80 is used for generating the sample clock $f_{s2}$. It should hold that the clock period is $(K/N).(1/f_b)$. As an example, with N=3, M=4, K=5, and received samples numbered 1, 2, ..., 12, the samples of the reconstructed pattern are 1, 6, 11, 4, 9, 2, 7, 12, 5, 10, 3, 8. The idea behind the frequency-shift embodiment is that samples from the repetitive pattern 'belonging' to the same bit are grouped together when the pattern is reconstructed. The parameter K has to be chosen such that the greatest common divisor of both K and N, and K and M must be equal to one, to achieve a gradual shift and to achieve a correct mapping onto the repetitive ranging-bit-pattern. More generally, first sample fs1 is taken, then sample (1+J) mod (NM), then sample (1+2J) mod (NM), and so on, mod being a modulo-operand, J=(1+αNM)/K, for α∈N as small as possible. By taking K>N, the sampling frequency $f_{s2}$ is lower than the data bit rate $f_b$, whereas for K<N the sampling frequency $f_{s2}$ is higher than the data bit rate $f_b$. The M-bit pattern is repeated K times. When using the preamble PBP, M must be greater than the maximum error (in bit periods) in the detection of the trailing edge of the preamble PBP. The preamble PBP is used to reduce the coarse ranging inaccuracy and can in principle be dispensed with. However, by using the preamble PBP, the length of the elementary bit pattern can be reduced. The preamble being present, the main station 2 proceeds as follows. After a ranging request for a given substation has been issued via a housekeeping time slot in the downstream frame down, the processing means 32 starts counting the round trip delay in integer numbers of data-bits periods, at the signal S2, having the predetermined time TREF with respect to the beginning of the multiframe down in downstream direction. At the same time the analog-to-digital converter 29 starts sampling in the ranging window RW searching for a response of the substation to the ranging request. On detection of the trailing edge of the preamble PBP the sampler adopts a periodic multi-phase rhythm, as described with respect to the first embodiment. The multi-phase rhythm can be interpreted as a stroboscopic search for the known ranging-bit-pattern transmitted by the relevant substation to the main station 2. With the present invention, in principle, any desired fine ranging accuracy can be achieved, although in practice a 0.1 bit accuracy would suffice.

Figure 7:
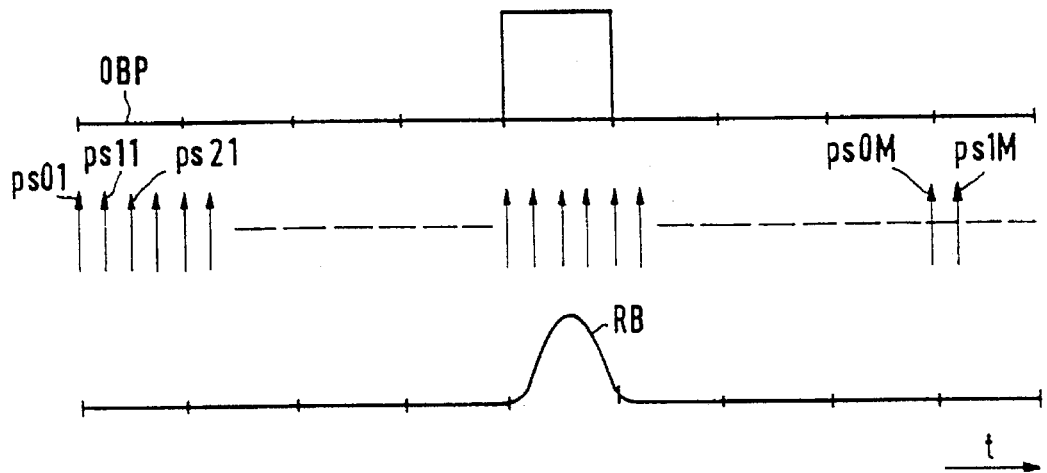
FIG. 7 shows a quasi-oversampled ranging-bit-pattern according to the present invention.

FIG. 7 shows a quasi-oversampled ranging-bit-pattern OBP according to the present invention. Shown are regrouped samples from the first embodiment, i.e. the phase shift embodiment as described in line A in FIG. 6. Furthermore, for better matching, amplitudes of the reference bit pattern to be stored in the processing means 32 could be adapted to the received signal shape, shown in FIG. 7 by RB, a received bit.

Figure 8:
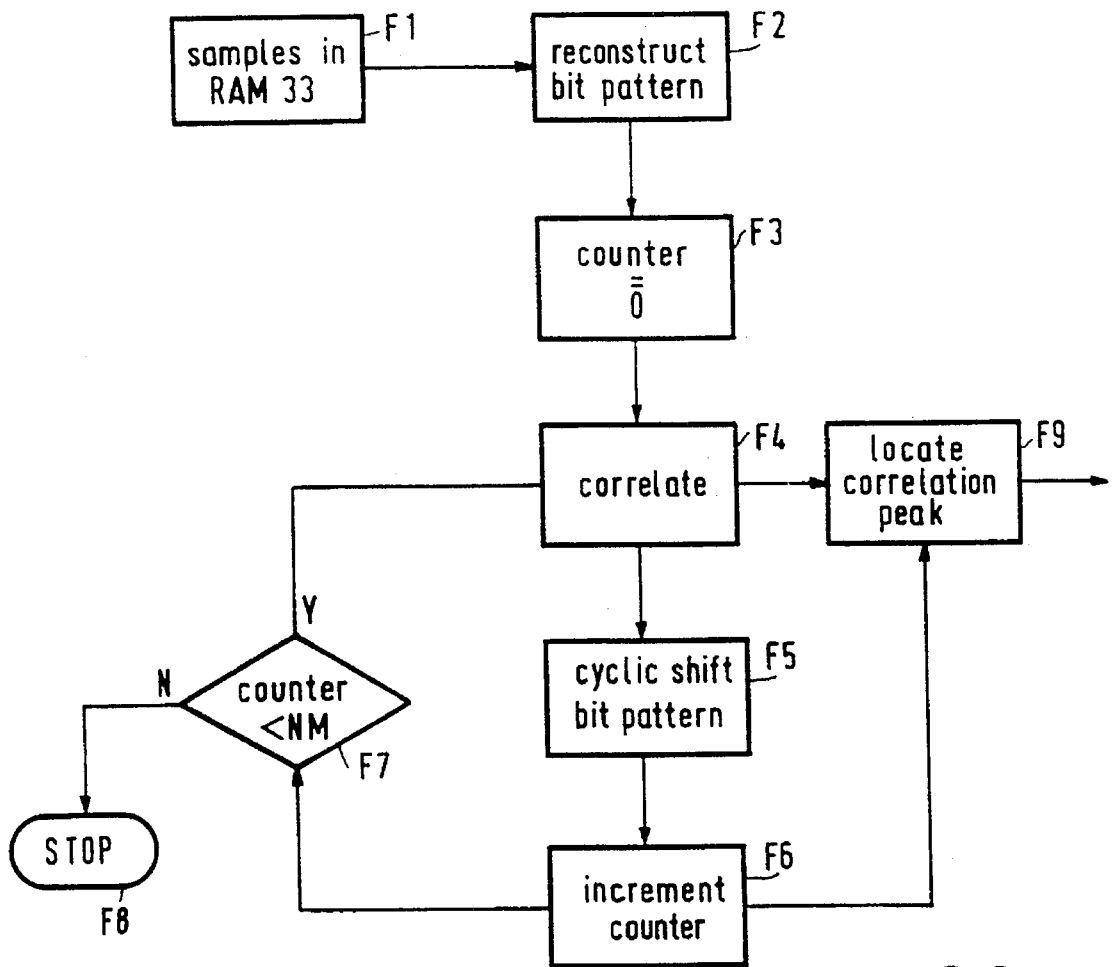
FIG. 8 is a flowchart showing how ranging control information is derived from the quasi-oversampled ranging-bit-pattern.

FIG. 8 is a flowchart showing how ranging control information is derived from the quasi-oversampled ranging-bit-pattern. Block F1 indicates the received samples from the memory 33, block F2 reconstruction of the bit pattern as described. In block F3 a bit-period counter in the processing means 32 is reset. In block F4 the reference pattern is correlated with the reconstructed bit pattern and a correlation value is submitted to block F9 where, at the end the maximum correlation peak is searched. In block F5 a cyclic shift is given to the bit pattern, and in block F6 the counter is incremented so as to prepare for the next correlation. In block F7 the counter is tested against its maximum value NM, the correlation process stopping in block F8 when the counter has reached its maximum value. After location of the maximum correlation peak in the block F9, fine ranging control information is available for assembling in the assembler 13. The main station 2 transmits the ranging control information to the relevant substation. The maximum correlation values obtained, both with the coarse and with the fine ranging methods, are also used for power control purposes. To this end the main station 2 determines a measure of the received power from the maximum correlation value, compares the measure with a desired value and transmits power control information to the substations 4 to 7 in the form of a deviation of the measure of the received power accordingly. The substations 4 to 7 adjust their power accordingly. At the end, it is thus achieved that all substation signals are received by the main station 2 with substantially equal power.

In the example given the processing means 32 are comprised in the main station 2, i.e. a centralized system is described. In another, decentralized embodiment, the ranging means 28, comprising the processing means 32, are located in the substations 4 to 7. Then, the main station 2 acts as a relay station for relaying the ranging information transmitted by the substations 4 to 7. The ranging process may be started on the initiative of the main station 2 or on the initiative of the substations 4 to 7 to be ranged.

What is claimed is:

1. A telecommunication system comprising: a main station and a plurality of substations, in which system communication between the main station and the substations occurs at a predetermined bit rate via a transmission channel in time intervals in accordance with a time division multiple access protocol, which channel is common to the substations; wherein, for ranging the substations, each substation comprises transmission means for transmitting ranging information to the main station and adjustment means for adjusting the time intervals for transmission of ranging information to the main station on the basis of ranging control information received from the main station, and the main station comprises receiving means for receiving the ranging information, sampling means for taking samples of the ranging information, and processing means for determining the ranging control information from the samples; and further wherein each substation is arranged to transmit to the main station ranging information including a repetitive ranging-bit-pattern, and the processing means in the main station are arranged to process samples of the repetitive ranging-bit-pattern such that a quasi-oversampled ranging-bit-pattern is obtained, the processing means being arranged to derive fine and/or coarse ranging control information from the quasi-oversampled ranging-bit-pattern.

2. A telecommunication system according to claim 1, wherein each substation is further arranged to transmit to the main station a preamble-bit-pattern preceding the repetitive ranging-bit-pattern, the processing means in the main station being arranged to derive coarse ranging control information from samples of the preamble-bit-pattern by evaluating logic transitions therein.

3. A telecommunication system according to claim 1, wherein the ranging bit-pattern comprises a succession of elemental bit-patterns, each elemental bit-pattern consisting of M bits having a bit period reciprocal to said predetermined bit rate and being such that all M−1 cyclic shifts thereof are different, M being an integer.

4. A telecommunication system according to claim 3, wherein for fine ranging with an accuracy of 1/Nth of the bit period and with a sampling rate of 1/K times the predetermined bit rate, the ranging-bit-pattern is repeated K.N times, K and N being integers and the greatest common divisor of K and M being one, K<M, and wherein a phase of a sampling clock for clocking the sampling means is shifted incrementally or decrementally during sampling, the processing means obtaining the quasi-oversampled ranging-bit-pattern by regrouping the samples.

5. A telecommunication system according to claim 4, modified in that the phase of the sampling clock is fixed during sampling, and in that the substations transmit the ranging-bit-pattern with successive phase increments or decrements.

6. A telecommunication system according to claim 3, wherein for fine ranging with an accuracy of 1/Nth of the bit period, the ranging-bit-pattern is repeated K times, the frequency of a sampling clock is N/K times the bit rate, K being chosen such that both the greatest common divisor of K and N, and of K and M, is one, the processing means obtaining the quasi-oversampled ranging-bit-pattern by regrouping the samples.

7. A telecommunication system according to claim 1 wherein, for obtaining a fine ranging error the quasi-oversampled ranging-bit-pattern is correlated with a reference-bit-pattern which is identical to the transmitted ranging-bit-pattern, the fine ranging error being obtained at maximum correlation of the received ranging-bit-pattern and the reference-bit-pattern.

8. A telecommunication system according to claim 7, wherein the reference-bit-pattern is amplitude scaled in accordance with an expected ranging-bit-pattern to be received.

9. A telecommunication system according to claim 1 wherein for coarse ranging the substations are arranged to transmit a low magnitude Pseudo Noise ranging Sequence in a frame based system, and wherein the main station is provided with Pseudo Noise Sequence based coarse ranging means for recovering coarse ranging information by correlating a received Pseudo Noise Sequence with a reference sequence, the coarse ranging means only correlating samples of the received ranging sequence substantially falling inside a time window reserved in the frame for fine ranging, no fine ranging taking place simultaneously.

10. A telecommunication system according to claim 1, wherein means are provided for determining a received power value from maximum ranging correlation values, and for transmitting power control information to the substations for adjustment of transmitting power in accordance with a deviation of the power value with respect to a desired power value, the substations comprising power adjustment means for adjusting the transmitting power in accordance with the power control information.

11. A telecommunication system comprising: a main station and a plurality of substations, in which system communication between the main station and the substations occurs at a predetermined bit rate via a transmission channel in time intervals in accordance with a time division multiple access protocol, which channel is common to the substations; and wherein, for ranging the substations, each substation comprises transmission means for transmitting ranging information to the main station, adjustment means for adjusting the time intervals for transmission of ranging information to the main station on the basis of ranging control information, receiving means for receiving the ranging information as relayed by the main station, sampling means for taking samples of the ranging information, and processing means for determining the ranging control information from the samples; and further wherein each substation is arranged to transmit a repetitive ranging-bit-pattern as ranging information and the processing means are arranged to process samples of the repetitive ranging-bit-pattern such that a quasi-oversampled ranging-bit-pattern is obtained, the processing means being arranged to derive fine and/or coarse ranging control information from the quasi-oversampled ranging-bit-pattern.

12. A main station for use in a telecommunication system adapted for communication at a predetermined bit rate with substations within the system via a transmission channel on the basis of a multiple access protocol, which channel is at least partially common to the substations, the main station comprising receiving means for receiving ranging information from the substations, sampling means for taking samples from the ranging information, and processing means for determining ranging control information from the samples, the ranging control information being transmitted to the substations, wherein the main station is arranged to receive a repetitive ranging-bit-pattern from a substation, and the processing means in the main station process samples of the repetitive ranging-bit-pattern such that a quasi-oversampled ranging-bit-pattern is obtained, the processing means deriving fine and/or coarse ranging control information from the quasi-oversampled ranging-bit-pattern.

13. A substation for use in a telecommunication system adapted for communication at a predetermined bit rate with a main station via a transmission channel in time intervals in accordance with a time division multiple access protocol, the substation comprising adjustment means for adjusting the time intervals for transmission of ranging information to the main station on the basis of ranging control information received from the main station; and wherein, for ranging, the substation transmits to the main station a repetitive ranging-bit-pattern as ranging information; the main station in the system being arranged to process samples of a ranging-bit-pattern received from the substation such that, for deriving the ranging control information, a quasi-oversampled ranging-bit-pattern is obtained.

14. A telecommunication system according to claim 2, wherein the ranging bit-pattern comprises M bits having a bit period reciprocal to the predetermined bit rate, the ranging-bit-pattern being such that all M−1 cyclic shifts thereof are different, M being an integer.

15. A telecommunication system as claimed in claim 3 wherein, for fine ranging with an accuracy of 1/Nth of the bit period and with a sampling rate of 1/K times the predetermined bit rate, the ranging-bit-pattern is repeated KN times, K and N being integers and the greatest common divisor of K and M being 1, where K<M, and wherein a phase of a sampling clock for clocking the sampling means is fixed during sampling, and in that the substations transmit the ranging-bit-pattern with successive phase increments or decrements, and the processing means obtains the quasi-oversampled ranging-bit-pattern by regrouping the samples.

16. A telecommunication system according to claim 2, wherein, for obtaining a fine ranging error the quasi-oversampled ranging-bit-pattern is correlated with a reference-bit-pattern which is identical to the transmitted ranging-bit-pattern, the fine ranging error being obtained at maximum correlation of the received ranging-bit-pattern and the reference-bit-pattern.

17. A telecommunication system according to claim 3, wherein, for obtaining a fine ranging error the quasi-oversampled ranging-bit-pattern is correlated with a reference-bit-pattern which is identical to the transmitted ranging-bit-pattern, the fine ranging error being obtained at maximum correlation of the received ranging-bit-pattern and the reference-bit-pattern.

18. A telecommunication system according to claim 2, wherein for coarse ranging the substations are arranged to transmit a low magnitude Pseudo Noise ranging Sequence in a frame based system, and wherein the main station is provided with Pseudo Noise Sequence based coarse ranging means for recovering coarse ranging information by correlating a received Pseudo Noise Sequence with a reference sequence, the coarse ranging means only correlating samples of the received ranging sequence substantially falling inside a time window reserved in the frame for fine ranging, no fine ranging taking place simultaneously.

19. A telecommunication system according to claim 4, wherein for coarse ranging the substations are arranged to transmit a low magnitude Pseudo Noise ranging Sequence in a frame based system, and wherein the main station is provided with Pseudo Noise Sequence based coarse ranging means for recovering coarse ranging information by correlating a received Pseudo Noise Sequence with a reference sequence, the coarse ranging means only correlating samples of the received ranging sequence substantially falling inside a time window reserved in the frame for fine ranging, no fine ranging taking place simultaneously.

20. A telecommunication system according to claim 2, further comprising means for determining a received power value from maximum ranging correlation values, and for transmitting power control information to the substations for adjustment of transmitting power in accordance with a deviation of the power value with respect to a desired power value, the substations comprising power adjustment means for adjusting the transmitting power in accordance with the power control information.

21. The substation according to claim 13 further comprising, for coarse ranging, means for transmitting a preamble-bit-pattern preceding the repetitive ranging-bit-pattern.

* * * * *